United States Patent [19]
Kovacs

[11] Patent Number: 6,013,174
[45] Date of Patent: Jan. 11, 2000

[54] PROCESS TO REMOVE ASH-FORMING CONTAMINANTS FROM USED OIL

[75] Inventor: Geza L. Kovacs, Baltimore, Md.

[73] Assignee: U.S. Filter Recovery Services (Mid-Atlantic, Inc.), Baltimore, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/873,804

[22] Filed: Jun. 12, 1997

Related U.S. Application Data

[63] Continuation of application No. 08/604,652, Feb. 21, 1996, abandoned.

[51] Int. Cl.$^7$ ................................................. C10M 175/00
[52] U.S. Cl. ........................... 208/186; 208/179; 208/186
[58] Field of Search ..................................... 208/179, 186

[56] References Cited

U.S. PATENT DOCUMENTS

| | | | |
|---|---|---|---|
| 1,622,278 | 3/1927 | Boyd | 208/179 |
| 1,778,831 | 10/1930 | Jones | 208/179 |
| 1,926,188 | 9/1933 | Ambler, Jr. | 208/186 |
| 2,305,464 | 12/1942 | Ashworth | 208/179 |
| 2,319,599 | 5/1943 | Harris | 208/186 |
| 2,446,489 | 8/1948 | Schaafsma | 208/179 |
| 2,459,409 | 1/1949 | Bjornstjerna | 208/179 |
| 2,789,083 | 4/1957 | Hardy | 208/179 |
| 3,919,075 | 11/1975 | Parc et al. | 208/180 |
| 3,923,643 | 12/1975 | Lewis et al. | 208/179 |
| 3,954,602 | 5/1976 | Troesch et al. | 208/179 |
| 3,990,963 | 11/1976 | Audibert et al. | 208/179 |
| 4,029,569 | 6/1977 | Ivey | 208/180 |
| 4,033,859 | 7/1977 | Davidson et al. | 208/179 |
| 4,250,021 | 2/1981 | Salusiinszky | 208/181 |
| 4,411,790 | 10/1983 | Arod et al. | 208/186 |
| 4,938,876 | 7/1990 | Obsol | 210/708 |
| 4,948,493 | 8/1990 | Wilson | 208/179 |
| 5,141,628 | 8/1992 | Marlin et al. | 208/186 |
| 5,458,765 | 10/1995 | West | 208/186 |

*Primary Examiner*—Helane Myers
*Attorney, Agent, or Firm*—Roylance, Abrams, Berdo & Goodman, LLP

[57] ABSTRACT

Simple, economical process for removing ash-formers from used oil, to reduce materially the ash content value of the reclaimed oil and enhance its value substantially.

12 Claims, 3 Drawing Sheets

6,013,174

PROCESS TO REMOVE ASH-FORMING CONTAMINANTS FROM USED OIL

This is a continuation of application Ser. No. 08/604,652 filed Feb. 21, 1996, now abandoned.

FIELD OF THE INVENTION

This invention relates to a method that is simple and inexpensive, for processing used hydrocarbon oils that contain ash-forming components, to produce oil that has a reduced content of ash-forming components. In particular, the invention relates to a process for removing ash-forming components and solids, including organo-metallic additives, carbon particles, and metal particles, from used oil.

In one embodiment the invention relates to a process which provides integrated resource recovery and minimization of pollution. The invention particularly relates to a simple process that can be effective for the removal of virtually all ash-forming materials that are found in used hydrocarbon oils, to generate products of materially enhanced economic value.

BACKGROUND

The base oils for hydrocarbon lubricating oils are generally produced in refineries from distillates. These base oil streams are often produced in several steps, in plants that may use solvent extraction, solvent dewaxing, and hydrogen treatment. To be able to meet the demands of modern engines, particularly those of internal combustion engines, various additives are often incorporated in the base oil. Such additives include, for example, antioxidants, pour point depressants, viscosity index improvers, detergents, dispersants, and other additives.

In use lubricating oils are generally not consumed in the usual sense and, except for some loss, are recovered as used oils. In the case of motor oils, usually more than 60% of the original oil is recovered when the oil is changed. Oil changes are necessary because in use the oil is contaminated with unburned fuel, metal particles, carbon particles, tars, polymerized material and the like. Used oil also becomes contaminated, inter alia, by combustion products which are kept dispersed by the added dispersants, and by lead from leaded fuel where used, typically 0.1%–0.8% by weight of the oil, usually in the form of lead oxide dispersed with the combustion products. Used oil also on analysis has a high ash content, typically in the range of 1%–2% by weight of the oil, due to metals (mainly Ca, Ba, and Zn) which were added to the base oil as ingredients of additives.

Used lubricating oil also usually contains significant amounts of water. The water content of freshly drained used lubricating oil is usually less than 0.5%, but often increases during collection as a result of condensation, contamination, or both, for example. This water is also dispersed in the used lubricating oil and settles out, if at all, very slowly.

More than one billion gallons of lubricating oil are used in the United States on a yearly basis, according to the National Oil Refiners Association. Substantial quantities of this oil are available for disposal, somehow, after use. Collection centers for used oil are available in most cities, to encourage the use of environmentally acceptable or beneficial disposal techniques. Even so, of all the used oil that is potentially available for recovery, about 25% is unaccounted for.

Only about 75% of the used oil generated in the United States is currently being reclaimed each year. Ideally, all of the used oil should be reclaimed in order to avoid the damage to the environment that is caused by improper disposal.

However, even reclaimed oil causes environmental concern because of its high content of ash forming materials. Reclaimed oil is now primarily used as a fuel by being blended with virgin fuel to meet stack emission standards. Based on an analyzed ash content of 1% by weight of the oil, each million gallons of reclaimed oil that is burned releases about 37 tons of ash into the air. Since there may be 800 million gallons or so of used oil per year, currently, in the United States, use of the used oil as a fuel is not an attractive approach from an environmental standpoint.

After the ash-forming materials are removed by the present invention such oils become useful as non-polluting heating fuel, marine fuel, diesel fuel, and petroleum refinery cracker feed. In the past, recovered used lube oil has not been useful to oil refineries.

SUMMARY OF THE INVENTION

When oil is reclaimed according to the present invention, it is not only possible to make a reclaimed oil that on analysis is virtually free of ash-formers, but the process is simple and economically feasible.

The ambient pressure process of the invention removes ashless particles and constituents as well as ash-forming particles and constituents from modern used oils, including particles of colloidal size. Particles, and ash-formers which may be oil-soluble or oil-insoluble after thermal treatment, including decomposition products of modern organometallic additives which normally are oil-soluble, are removed from the oil in the process of the invention by washing with water and settling without using flocculants or agents which complex, chelate, or sequester.

The process of the invention has the simplicity of requiring only water washing and settling subsequent to ambient pressure heating and cooling. The results of this simple treatment are unexpected: it is possible to obtain a final product with an analyzed ash content well below 0.1% by weight of the processed oil, and routinely below 0.01%, that is useful as is.

The process of the invention can be used to effect almost any desired reduction in the ash-former content of its used oil feedstock. Any substantial reduction in the content of the ash-formers in reclaimed oil generally enhances the economic value and utility of the reclaimed oil. For example, reclaimed oil can be sold as #4 heating fuel if the ash content is less than 0.1%. Cracker feed, which has a high economic value, must have a low content of ash-formers, preferably less than 0.01%, and can routinely be produced from dirty, wet, used lube oil by the process of the present invention.

The invention in its broad aspects is a process for reconditioning used oil that contains ash-forming components in sufficient quantity to produce an undesirably high ash analysis, comprising heating the used oil to an elevated temperature and for a sufficient time to render transferable to water at least some of said ash-forming components of the used oil, then washing the oil with water and optionally with added demulsifier, and then recovering the processed oil with a substantially reduced level of said ash-forming components.

In one embodiment the invention is a process for reconditioning a demulsified used, petroleum-based lubricating oil that contains ash-forming components including metallo-organic additives and, in addition, some moisture, said ash-forming components being present in sufficient quantity to produce an undesirably high ash analysis of the used oil. This process comprises heating the demulsified oil to an elevated temperature for a sufficient time to render transferable to water at least some of the ash-forming components of the used oil, then washing the oil with an aqueous phase that optionally may include a demulsifier, separating oil from the aqueous phase, and then recovering the processed oil with a substantially reduced level of said ash-forming components.

In one preferred detailed embodiment, the invention is a method for the recovery of an essentially ashless oil from used lubricating oil that contains water and other contaminants. The recovered oil is usable as fuel oil, diesel oil, fuel oil, or "cracker feed", depending on the extent to which the ash-formers have been removed.

The process of the invention may involve two stages, (1) demulsification and (2) reduction of the content of ash-formers. However, while the use of demulsified used oil as the feedstock for stage (2) is preferred, it is not necessary. Stage (2) can be used successfully when a wet, dirty, contaminated used oil is the feedstock. This two stage preferred processing method of the invention comprises the following:

(1) producing a demulsified oil from used lubricating oil by
  (a) mixing demulsifier with the used lubricating oil;
  (b) heating the mixture to 190° F.–200° F. (88° C.–93.3° C.);
  (c) allowing the heated mixture to settle and thereby form an oil layer, a water layer; and a sediment layer; and
  (d) draining off the water layer, and recovering the oil in the oil layer for further processing;

(2) removing ash-formers by transferring them to an aqueous phase by
  (a) heating the recovered oil of step (1) to 600° F.–650° F. (315° C.–345° C.), using any appropriate holding time as later described, then
  (b) cooling the oil to less than about 200° F. (94° C.);
  (c) preferably recycling a portion of the cooled oil into the supply feed for step (2);
  (d) cooling and condensing water vapor and organic vapor formed during the heating of the used oil in step (2)(a);
  (e) mixing the remaining (non-recycled) portion of the oil from step (2)(a) or (b) with demulsifier-wetting agent, water, the condensed product of step (2)(d), and with a mixture of recycled water and oil from the subsequent filtration step (2)(g) below, to produce a blended mixture of the supply stream to this step with recycle streams;
  (f) allowing this blended mixture from step (2)(g) to settle into an oil layer, an interface layer, and a water layer, and draining off the interface layer and the water layer;
  (g) adding surfactant to the drained streams of the water layer and the interface layer from step (2)(f), which streams are primarily water, and then filtering it, to produce a filter cake and a water-oil mixture, which mixture is then recycled back into the supply stream to step (2)(e); and then
  (h) collecting the oil layer containing 1% water or less from the settling step (2)(f) to thereby obtain as a product a purified oil of materially reduced ash-former content.

The process does not always result in the production of an interface layer. When one develops, it is usually made up of a mixture of oil, water, and dirt. Since the oil content has value, it is preferably recycled, as in 2(g) above.

In another aspect, the invention is a method for the recovery of oil from used lubricating oil by a process comprising (A) heating used oil from about 600° F. to about 650° F. (315° C.–345° C.), and holding the oil at the elevated temperature for a sufficient time to render transferable to water at least some of the ash-formers in the oil;
(B) cooling the oil to less than about 200° F. (94° C.);
(C) recycling a 10% to 30% portion of the cooled oil into the supply feed for step (A);
(D) cooling and condensing water vapor and organic vapor from step (A);
(E) mixing the remaining (non-recycled) portion of the oil from step (B) with demulsifier-wetting agent, make-up water, the condensed product of step (D), and with the mixture of water and oil filtrate from subsequent step (G), to produce a mixed product;
(F) allowing the mixed product from step (E) to settle into an oil layer, an interface layer, and a water layer, and draining off the interface layer and water layer;
(G) adding surfactant to the drain-off of step (F) and then filtering it, to produce (a) a filter cake and (b) a water oil mixture, which mixture is then recycled back into the mixing step (D); and
(H) collecting the oil layer from the settling step (F) to obtain a product that is a purified oil which has a materially reduced ash-former content.

DETAILS OF THE INVENTION

Except in the claims and in the operating Examples, or where otherwise expressly stated, all numerical quantities in this description that refer to amounts of material or to conditions of reaction and/or use are to be understood as modified by the word "about", in describing the broad scope of the invention. However, practice of the invention within the stated numerical limits is generally preferred.

Also, unless expressly stated to the contrary: percent, "parts of", and ratio values are by weight. Temperatures should be understood to be degrees Fahrenheit unless stated to be otherwise. The description of a group or class of materials as suitable for use in the practice of the invention or as preferred for a given purpose in connection with the invention, implies that mixtures of any two or more of the members of the group or class are suitable or preferred, as well as any individual member named. The description of a particular material in chemical terms, for the performance of a particular function, should not be considered as limiting with respect to that particular function.

The process of the present invention would be useful for separating any emulsified mixture of oil, water and contaminants. However, preferably, the process is used to purify used lubricating oil.

Figure 1:
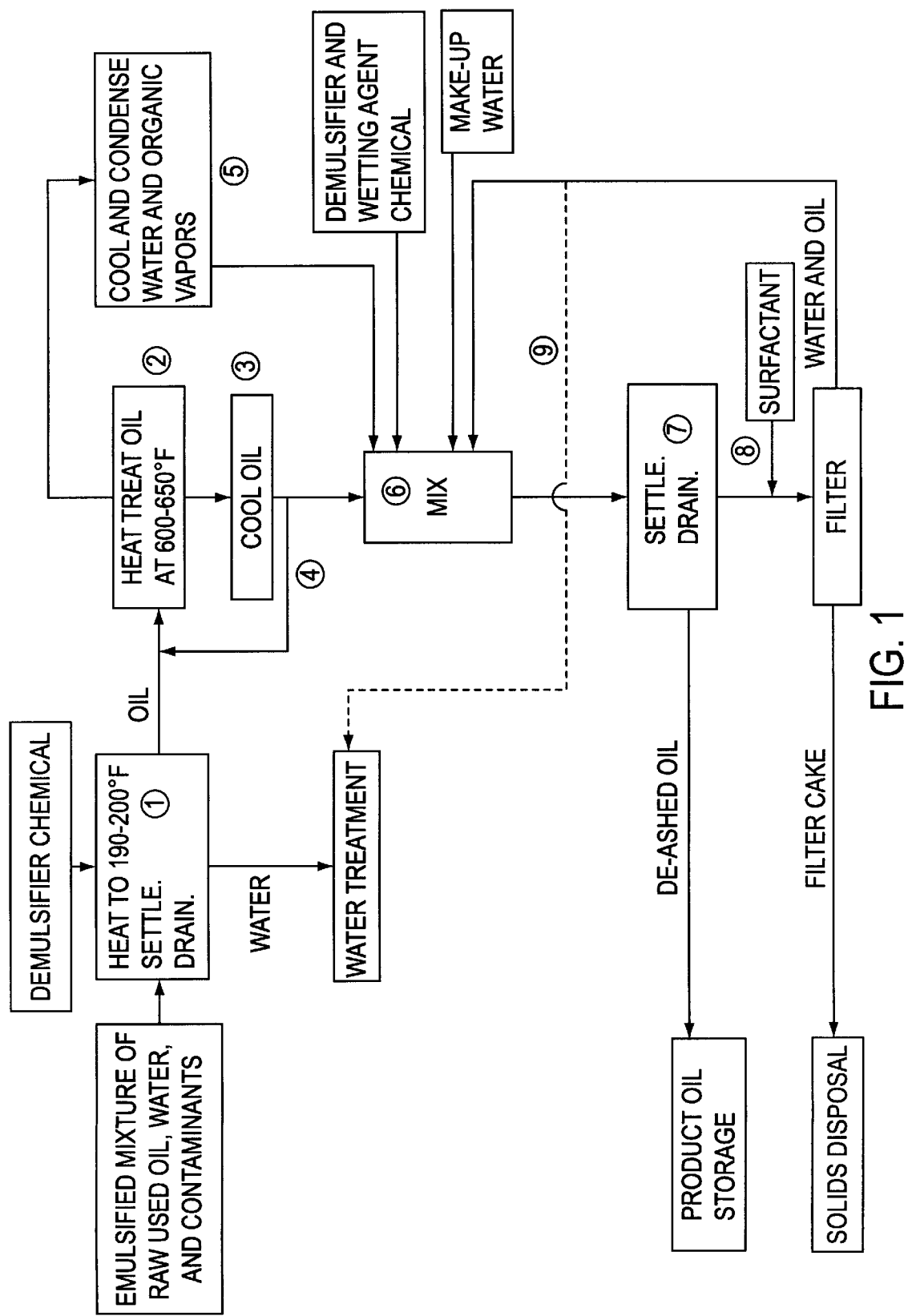
FIG. 1 is a schematic flow diagram of one preferred embodiment of the invention, which is the two stage process. The first stage consists of a processing step wherein a used oil of reduced water content is produced from a used oil feedstock. In the second stage, the oil product of the first stage is de-ashed by a process comprising heating the used oil containing ash-forming constituents, cooling it, partially recycling the cooled oil, mixing the cooled oil stream with two recycle streams, water, and demulsifier, to form a mixture and permitting the mixture to settle. Often the mixture will settle into three layers, an oil layer, an interface layer formed of oil, water, and dirt, and a watery layer. The next step is that of draining off the interface and watery layers, and recovering the separated oil layer, as a product that has a substantially reduced content of ash-formers. This is followed by combining the drained interface and watery layers with surfactant, then filtering to obtain a filtrate which is recycled to the mixing step, and recovering a filter cake which is disposed of, FIG. 2 illustrates a one stage process for producing de-ashed oil from used oil containing ash-forming constituents comprising a heat-treating step, a cooling step, a recycling step wherein a portion of the cooled oil is recycled to the initial used oil supply stream; a mixing step wherein the remaining cooled oil is mixed with a demulsifier-wetting agent, water, and water and oil from two recycle streams; a settling and draining step; a filtering step wherein a mixture of surfactant and the interface and watery layers from the settling step are filtered, the filter cake formed is disposed of, and some of the filtrate is recycled to be mixed with the cooled oil; a cooling and condensing step wherein the vapors from the initial heat-treating step are condensed and, optionally, mixed with the cooled oil; and wherein the oil left after the draining step is collected as the final product of the invention, as essentially ash-free oil.

Referring now in detail to FIG. 1, and using numerals of reference to designate generally the several steps or stages of the process, in the two stage embodiment of the invention, the used oil emulsion to be treated is mixed with an effective amount of a surfactant (or surfactants) which acts as a demulsifying agent. The mixture is heated to and maintained at a temperature in the range of from about 190° F. to about 200° F. (88° C.–93.3° C.). The heated mixture is allowed to settle into an oil layer and a water layer. When equilibrium is reached, the water layer is drained off and the demulsified oil layer is ready for the second stage of the processing.

Gravity settling to effect separation is simple, inexpensive, and effective. However, centrifugation and other separation techniques can be used although they are probably more expensive.

This demulsification step removes not only water but also emulsifiers, chemicals which disperse and suspend solids, and some water-soluble ash-formers, which separate out with the water phase. The dehydration might be accomplished by evaporation instead of by phase separation, but aqueous removal by demulsification: minimizes the amount of solids to be removed later; improves oil yields; and facilitates the separation and removal of water and of solids during the subsequent stage of the process.

The demulsification step removes a portion of the ash-formers and dirt present in the used lube oil feedstock. After demulsification, the ash-former content of the demulsified oil may be about 0.65% by weight of the oil, or, with a high quality used oil feedstock, in the range of 0.4% to 0.5%.

The demulsified oil made during the initial stage 1 now enters the second stage 2. As an initial step in stage 2 the oil is heated to 600° F.–650° F. (315° C.–345° C.).

This thermal treatment work has been done at 600° F. (315° C.) using a retention time of 4 hours. At elevated temperatures in the range of about 580° F. (304° C.) up to about 620° F. (327° C.), a hold time ensures complete ash removal. Good results are also produced by heating to 650° F. (345° C.) with no deliberate holding time. At 650° F. a holding time optimizes the rate of settling in the subsequent settling step. This optimization is attributed to agglomeration. The holding time should not be overly prolonged, since the usual observed result is that settling rates are slower than optimum.

Commercial processing facilities can often operate effectively at a temperature below 650° F. (345° C.). Equipment for operation at 600° F. (315° C.) or lower is more readily available and cheaper than equipment for processing at 650° F. (345° C.). If thermal cracking is significant at 650° F. (345° C.), operation at a lower temperature may produce less carbon and therefore less filter cake for disposal. It would also produce less light-end hydrocarbons which would be lost if the oil were to be refined to make lubricating oil base stock. Heating to 600° F. and holding for 4 hours produces good results with a good settling rate and good yield. The use of lower temperatures is possible and should generate good results with appropriate holding times, which may be longer than or less than 4 hours, depending on the characteristics of the used oil and other variable processing conditions.

Following the heating step 2, the oil is cooled by heat exchange, step 3.

The heat-treated oil could be cooled to 190° F.–200° F. (88° C.–93.3° C.) but because of heat exchanger efficiencies, and because the water added in a following step will not necessarily be heated, oil may exit the heat exchanger at greater than 200° F. (93.3° C.), and the water added in the subsequent mixing step 5 may be adjusted to produce a mixture at 190° F.–200° F. (88° C.–93.3° C.), at the discharge of the mixing operation 5. Such cooling by the addition of water is incidental to the process.

Settling rates may be optimized by recycling a 10% to 30% portion of the heat-treated cooled oil to the heat-treatment step. This optimization is believed to be attributable to the availability of nucleation sites (seeding) with consequent formation of larger particles (not the same as a agglomeration of smaller already-formed particles.) In practice, this recycle can be done by leaving a portion of the heat-treated oil in the heat-treatment vessel used in step 2. A 20% recycle rate was found to produce good results, but other rates can be used. The appropriateness of this recycle rate is a matter of judgment, and a suitable rate can easily be selected by a skilled operator, based on experience.

The cooled oil from step 3 is then mixed in step 6 with a suitable amount of surfactant and clean water. Optionally, a wetting agent may also be added.

It is sufficient in the mixing step 6 to add surfactant and fresh water, but reusing clean water from a subsequent filter step, to be described presently, conserves surfactant, and adding condensed light ends from the heat treatment step 2 also minimizes the water requirement (i.e., step 5). This mixing step 6 will preferably operate with an oil/water ratio of about 3 to 1, or about 25% water overall. This amount of water provides enough aqueous volume to allow the water-wetted solids to separate as completely as possible from the oil.

In practice, the various surfactant and water streams may be mixed in a tank from which they will be pumped into a pipe carrying cooled heat-treated oil, or they could be injected into the pipe separately or together.

Mixing of the oil and water streams can be accomplished by any suitable means. In-line mixing is satisfactory.

Any suitable surfactant may be used. A commonly used surfactant, ethoxylated nonylphenol, is very satisfactory here. The demulsifier, surfactant, and wetting agent described as used in the FIG. 1 process may be, in fact, the same chemical.

Following the mixing step 6, the resulting mixture is fed in step 7 into a container and allowed to settle to equilibrium into an oil layer, an interface layer, and a watery layer. The interface layer and watery layer are drained off. The oil layer is the final product, de-ashed, and ready for use. The interface layer and watery layer contain, inter alia, oil and particles.

In a next step 8, the drained-off interface layer and the water layer are mixed with a suitable amount of surfactant and the resulting mixture is filtered to remove the solids. The filtrate comprises water and some oil, and may be recycled into the mixing step 6. The filter cake is disposed of.

To operate the process illustrated in FIG. 1 in an economical and optimized manner, the operator of the process may find it desirable to adjust the suggested temperatures, times, and recycle ratios, to comport with the properties of the used oil that is used as a feedstock, and the observed results. Generally, the oil will be a petroleum-based lubricating oil, that has been used in an internal combustion engine. Such an oil, if not changed frequently, may accumulate a great deal of foreign material, such as bits of metal from the engine in which it is being used. Carbon solids may also appear in the oil, produced by carbonization of the oil. In some cases, dust may have accumulated in the oil as still another contaminant.

While the process has been described in detail based on experience with used automotive lubricating oils, it is deemed equally suitable for use in restoring the usefulness of other used oil and near oils, that is, synthetic products.

Among the process options that can be used, and adjusted, to improve recovery resulting from the process, are a recycle of cooled oil from the cooling step 3 back to the supply line to the heat treatment 2. Oil vapors and water vapors escaping from the heat treatment 2 can be cooled and condensed in a suitable piece of equipment, such as a heat exchanger condenser, and maybe are added back into the process in the mixer.

Toward the end of the processing in step 7, the de-ashed oil (which is the final product of the process) is recovered after the interface layer and watery layer have been drained off. This recovered de-ashed oil typically contains an amount of water where the proportion of water is typically 1% or less.

Surfactant is injected into the drained interface and water layers, and then the drained material is filtered to remove solids in the form of a filter cake. What is left after filtration is a water and oil filtrate mixture, with a relatively small proportion of oil being present. As shown in FIG. 1, generally this water and oil filtrate is recycled to the mixing step 6. However, all or a part of it may be diverted through a line 8 to water treatment.

The recycle ratios mentioned specifically have been found to be useful. However, higher or lower ratios can be expected to produce satisfactory results. In some cases, different ratios would produce superior results.

The temperature treatments described above have been found to be useful. Higher or lower temperatures may be used, depending on the experience of the operator and the characteristics of the used oil feedstock. A lower heat treating temperature in stage 2 may be used with a longer holding time, within a broad range of temperatures such as, for example, 500° F. to 600° F. (204° C.–315° C.). Longer holding times at lower temperatures can be expected to produce somewhat similar results. Generally, holding equates to cost, and to achieve lower costs, a higher throughput rate is ordinarily desirable. Generally, heat treatment at 600° F.–650° F. (315° C.–345° C.) is preferred since the relatively higher temperatures in this range produce almost immediate desired results, whereas at 600° F. (315° C.) the reasonable holding time of a few hours achieves comparable results. Temperatures higher than 650° F. (345° C.) may be used if there is no charring. If charring occurs at any temperature, then a lower temperature and a holding period should be used.

Figure 2:
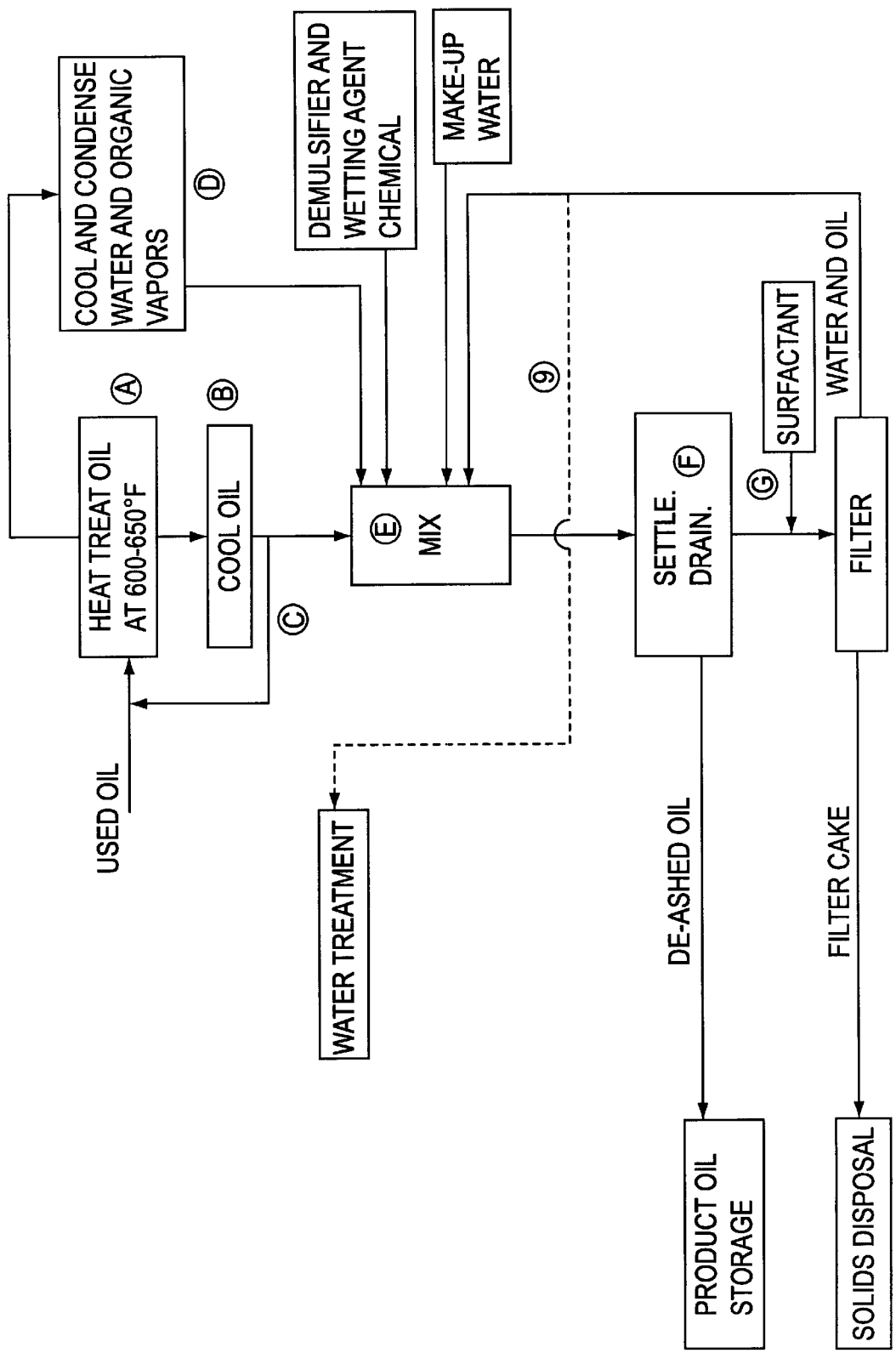

Referring now in detail to the process illustrated in FIG. 2 of the drawings, the used oil feedstock may have been demulsified by heating and settling, as in the two-step process of FIG. 1. However, for some used oils this preliminary treatment is not needed, and the feedstock may be subjected initially to a heat treatment at or above 600° F. (315° C.). This first heat treatment, step A, generates water and organic vapors that may be cooled and condensed in a heat exchanger D. The condensate of this heat exchanger D is desirably transferred into the mixer E.

The hot oil from the heat treatment zone A is then cooled in a step B. The cooled oil is then transferred to the mixing step E, although preferably in a batch process, some part of the cooled oil, such as 15%–25%, for example, or less, could be transferred back to the feed line as recycle to the heat treatment zone A.

Other streams are also fed into the mixing step E. For example, a demulsifier and/or wetting agent may be injected, and water may be injected. In addition, toward the end of the process there is a filtration step operating on an aqueous layer, and the filtrate may be recycled to the mixing step E.

The liquid mixture from the mixing step E is then transferred into a settling tank, and permitted to settle. The oil layer is removed as a de-ashed oil product. The interface layer and water layer are transferred to a filter, and during its transfer preferably, a surfactant is injected into the liquid. The filter removes particles from the oil to form a filter cake. The filtrate from this operation is returned to the mixing step E.

Preferably, the used oil from a gasoline station, or from a collection center, is accumulated until a quantity of used oil has become available. At a central collection location, several batches of used oil from different sources may be commingled for processing as a mixture. If all of the oils collected are mixed together, such mixtures are a very satisfactory feedstock for the practice of the invention.

The process of the invention has the advantage of simplicity. In the past, much more severe conditions have been used for processing used lube oil, with less satisfactory results. Generally, the processed oil retained an ash content that was relatively high compared to the present invention. Surprisingly, the practice of the present invention results in excellent separations and produces a de-ashed, washed oil product that is essentially ash-free.

Considering the process of the invention in its most basic form, and reflecting the basic contribution to the art that the inventor has made, the step is a heat treatment of demulsified oil at a sufficiently high temperature, or at a sufficiently high temperature and exposure time, to effect a decomposition or other change of state of the metallo-organics in the oil so that they can be transferred into the aqueous phase in a subsequent water washing step. The oil is then cooled and subjected to washing with water and preferably with additional demulsifier. Settling is then permitted to occur, and because of heat treatment and hydration it is found that the ash content of the recovered processed oil is unexpectedly low. This is a remarkable step forward in the art and a remarkable advance. It permits the economic processing of used lube oil to produce first grade products that are essentially free of ash.

It has been postulated by the inventor that some of the wash water is reacting with the solids (i.e., hydrating the solids) in the heated used oil. The hydration appears to be an irreversible reaction which allows the hydrated solids to be separated from the base oil by settling. Settling can be carried out at a temperature below 190° F. However, higher temperatures are preferred because the settling takes place faster.

To demonstrate these unexpected results, the ash content of an unused, high grade lube, commercially available oil is generally in the range from 0.75% to 1.25% by weight of the oil. Processed used lube oils, if properly processed in accordance with the present invention, can routinely be produced at ash contents in the range from 0.00% to 0.01% by weight of the processed oil.

The process of the invention can be practiced as a batch process, a continuous process, or as a hybrid batch-continuous process. While a processing temperature of 600° F. (315° C.) or higher is preferred, temperatures as low as 500° F. (260° C.) or more are useful. Temperatures in the range of 550°0 F. (288° C.) to 650° F. (343° C.) are generally preferred. A most preferred temperature range, for efficiency, is 600° F. (315° C.) to 650° F. (343° C.). The process is versatile. To achieve a reclaimed oil at any desired content of ash-formers, there are levels of time and temperature that will accomplish the objectives.

Experiments were run to determine what the correlation was between the number of hours a crude oil sample was thermally treated, i.e., held at an elevated temperature, and the ash content of the base oil recovered as the final product according to the process of the invention.

A quantity of used crankcase oil was heated to 550° F. and maintained at that temperature for 12 hours. A water-surfactant mixture was prepared as follows. 25 ml of water which had been heated to 180° F. was mixed with 0.5 ml of ethoxylated nonyl phenol, a surfactant.

At the two hour mark, 75 ml of the heat treated oil were removed from the flask and placed in a suitable tube together with the 25 ml of the prepared water mixture. The tube was rocked back and forth 100 times to effect mixing, and then allowed to settle overnight, for 12 hours. After 12 hours of settling, the oil layer was separated out as a final product. The final oil product was tested and it was determined that it had a residual ash content of 0.062%.

Figure 3:
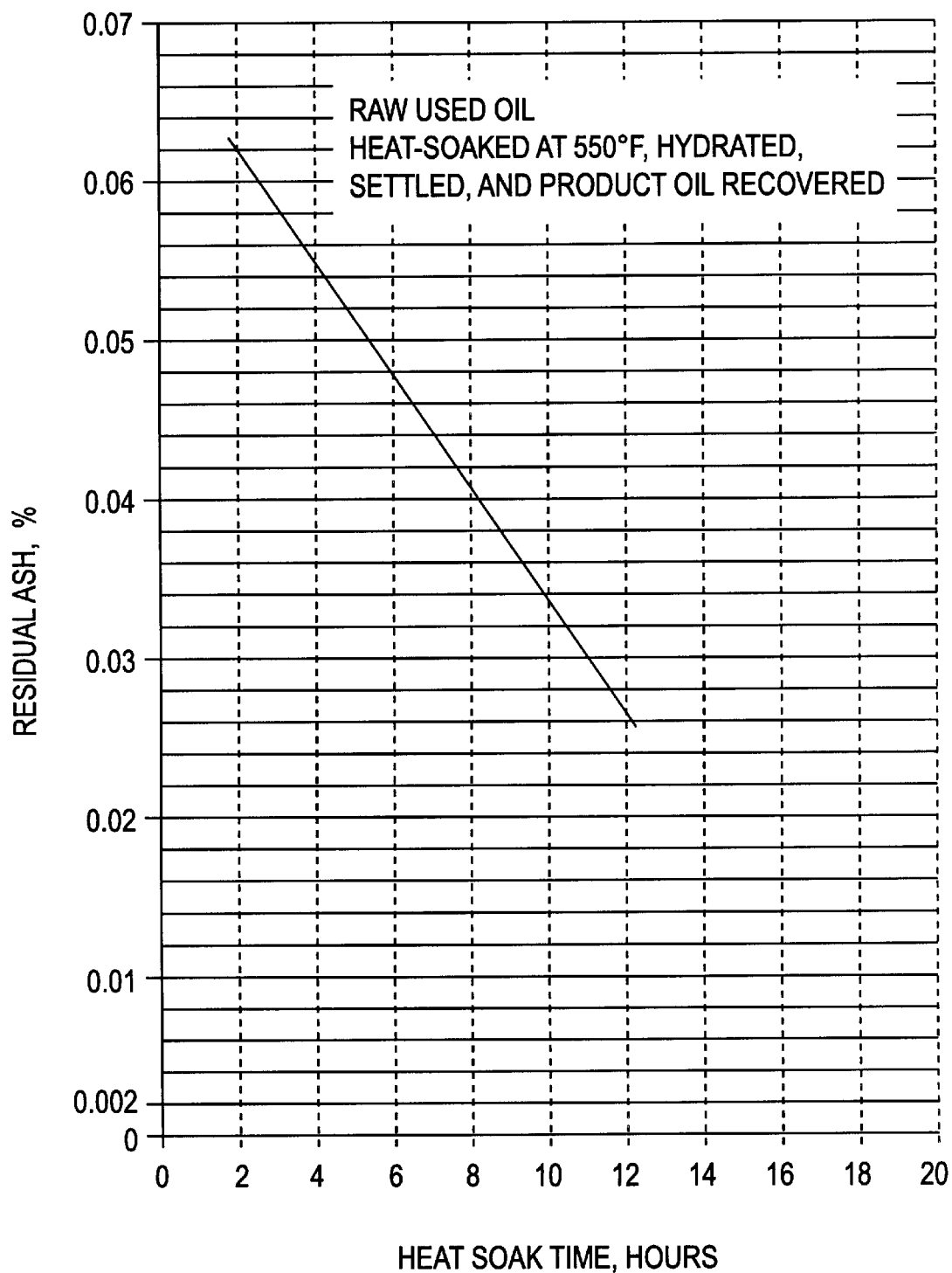
FIG. 3 is a graph that illustrates the correlation between the number of hours that the used oil is maintained at 550° F. and the percentage of residual ash-former content of the final processed product.

The test was repeated four times using samples of the heated oil, the same amount of water, and the same amount of surfactant. Only the holding time of the oil sample at the elevated temperature was varied. The several heated samples of 75 ml each were obtained after 4 hours, 6 hours, 8 hours, and 12 hours of heating, respectively. The residual ash content of the recovered base oil were determined to be 0.054%, 0.048%, 0.040%, and 0.027%, respectively. The results of the five tests are shown graphically in FIG. 3. There is no reported reading at 10 hours because the sample was spoiled, i.e., accidently knocked over. The graph shows a linear correlation between heat treatment time and the residual ash content.

It is known from other experimental data that if higher heat treatment temperatures are used, a shorter holding time is necessary to obtain a product with about the same very low ash content. The most preferred heat treatment temperatures are in the range of from about 600° F. to about 650° F. A preferred range is 550° F. to about 650° F. However, good results can be obtained using temperatures as low as about 500° F. The economics of the process dictate using the most preferred heat treatment temperatures. If used oil is heated to about 700° F., cracking may occur, which will reduce the efficiency of the process. For that reason, treatment temperatures should be no more than about 650° F.

While the invention has been described in connection with some specific embodiments thereof, it should be understood that these embodiments are presented in an illustrative rather than in a limiting sense.

I claim:

1. A process for cleaning used lubricating oil comprising the steps of:
   adding a demulsifier to said used lubricating oil,
   heating the mixture to a temperature within the range from about 190°–200° F.,
   allowing the mixture to separate into demulsified used oil, water, and sediment layers;
   passing the demulsified used oil to a heating unit and heating said used oil to an elevated temperature within the range from about 500°–650° F. to form heat treated oil, cooling the heat-treated oil,
   recycling 10–30% of the cooled, heat-treated oil to said demulsified used oil as feed to said heating unit.

2. The process of claim 1, wherein said heating step is at a temperature of at least about 580° F. (304° C.).

3. The process of claim 2, wherein said heating is at a temperature of at least 600° F. (315° C.) and is carried on for not more than 4 hours.

4. The process of claim 1, wherein said heating is at a temperature in the range from 600° F.–650° F. (315° C.–345° C.).

5. The process of claim 4, wherein said recovered, processed oil has such a reduced content of said ash-forming components that on analysis of said recovered oil, it has an ash content not in excess of about 0.3% by weight of said recovered oil.

6. The process of claim 5, wherein said recovered, processed oil has such a reduced content of said ash-forming components that on analysis, said recovered oil has an ash content not in excess of 0.1% by weight of said processed, recovered oil.

7. A process for reconditioning a demulsified used, petroleum-based lubricating oil that contains ash-forming components including metallo-organic additives and, in addition, some moisture, said ash-forming components being present in an amount of about 0.4% by weight of used oil or higher, in sufficient quantity to produce an undesirably high ash analysis of used oil, said process comprising
   heating said demulsified oil to an elevated temperature of at least about 600° F. (315° C.) and for a sufficient time to render transferable to water at least some of said ash-forming components of the used oil,
   washing the oil with an aqueous phase that optionally may include a demulsifier,
   separating oil from the aqueous phase,
   cooling the separated oil,
   recycling at least 10% of the cooled oil to the feed input of the heating step,
   recovering the remaining separated, processed oil with an ash content of about 0.1% or less.

8. The process of claim 7, wherein said heat treatment at a temperature of at least 600° F. (315° C.) generates aqueous and organic vapors, including the additional steps of condensing said vapors, and returning said condensate to the processing stream to be mixed with said oil from said heat treatment step after said heated oil has been cooled.

9. The process of claim 8 including the additional steps of mixing with said oil from said heat treatment step after it has been cooled, a demulsifying agent and water, to improve the rate of transfer of said ash-forming components from the oil into said aqueous phase.

10. The process of claim 7, wherein in the step of recovering the processed oil, said oil and water are formed into layers and the oil is separated from the aqueous layer, and wherein said aqueous layer is recovered, treated with a surfactant, and filtered to remove solids, and wherein the filtrate is recycled to form a part of said aqueous phase for washing the cooled oil.

11. A method for the recovery of a low ash analysis hydrocarbon oil from components consisting essentially of demulsified used hydrocarbon oil, water and optionally demulsifier wherein said demulisified used hydrocarbon oil contains ash-forming components in an amount of about 0.4% by weight of used oil or higher, in sufficient quantity to produce an undesirable high ash analysis, in which said process comprises (A) heating demulsified used hydrocarbon oil to about 600° F. to about 650° F. (315° C.–345° C.), then (B) cooling said oil to less than about 200° F. (94° C.), (C) recycling a portion of said cooled oil into the supply feed for step (A), (D) mixing the remaining portion of the oil from step (B) with demulsifier and water, to produce a mixed product, then (E) allowing said mixed product to settle into an oily layer and a water layer, and then separating said layers, and (F) recovering the oily layer from step (E) thereby to obtain as a product a purified, reconditioned oil that has a substantially reduced level of said ash-forming components wherein said processed oil has an ash content of about 0.1% or less.

12. The process of claim 11, wherein said demulsified used hydrocarbon oil is heated in said temperature range for 4 hours or less, and wherein said recovered, processed oil is characterized by such a reduced level of ash-forming components that the ash analysis of said recovered oil is not in excess of about 0.3% ash by weight of said processed oil.

* * * * *